United States Patent
Takayasu et al.

Patent Number: 6,001,238
Date of Patent: Dec. 14, 1999

[54] METHOD FOR PURIFYING PURE WATER AND AN APPARATUS FOR THE SAME

[75] Inventors: Jun Takayasu; Naoto Miyashita, both of Kanagawa-ken, Japan

[73] Assignee: Kabushiki Kaisha Toshiba, Kawasaki, Japan

[21] Appl. No.: 08/941,045

[22] Filed: Sep. 30, 1997

[30] Foreign Application Priority Data

Sep. 30, 1996 [JP] Japan .................. 8-276843

[51] Int. Cl.$^6$ .................................. C02F 1/461
[52] U.S. Cl. ............... 205/742; 205/757; 205/760; 204/275; 204/276; 210/900
[58] Field of Search .................. 204/275, 276, 204/269, 551; 205/742, 751, 760, 757; 210/900

[56] References Cited

U.S. PATENT DOCUMENTS

| | | | |
|---|---|---|---|
| 387,467 | 8/1888 | Webster | 204/276 |
| 4,917,782 | 4/1990 | Davies | 204/276 |
| 5,460,702 | 10/1995 | Birkbeck et al. | 204/276 |
| 5,776,323 | 7/1998 | Kobashi | 204/294 |

*Primary Examiner*—Kathryn Gorgos
*Assistant Examiner*—Thomas H. Parsons
*Attorney, Agent, or Firm*—Banner & Witcoff Ltd.

[57] ABSTRACT

A method of reducing the concentration of metal ions in pure water or ultrapure water and thereby obtaining pure water or ultrapure water. Such purified pure water or purified ultrapure water is used, for example, when washing semiconductor wafers, as a starting material of electrolytic ionic water, or for diluting washing water. A pair of carbon electrodes is disposed in an ultrapure water storage tank containing pure water or ultrapure water or in a purifying tank disposed in a line leading from an ultrapure water storage tank. A D.C. voltage is applied across the electrode pair. A carbon electrode material having a large specific surface area is chosen, and an electrode structure with which there is little detachment of carbon fragments is used. After the carbon electrode is molded, a carbon layer is formed on the surface of the molding by dipping the molding in an amorphous carbon bath. Because the carbon layer penetrates into the pores in the molding surface, the bonds between the carbon elements are strengthened, preventing carbon fragments from detaching. Because the electrode surfaces may be covered with filters, even if carbon fragments do detach, they are caught by the filters, preventing particles from entering the purified pure water or purified ultrapure water.

21 Claims, 10 Drawing Sheets

METHOD FOR PURIFYING PURE WATER AND AN APPARATUS FOR THE SAME

BACKGROUND OF THE INVENTION

1. Field of the Invention

The present invention relates to a method for purifying pure water or ultrapure water. The purified pure water and the ultrapure water are used, for example, as a solvent for etching or washing or for making electrolytic ionic water 2. Description of the Related Art Electrolytic ionic water made by an electrolytic ionic water production apparatus has been used in various fields and particularly has been extensively used in the manufacture of semiconductor devices and the manufacture of liquid crystal devices.

Conventionally, fluorine-based solvents such as Freon, $CCl_3F$, have been used for washing semiconductor substrates in the manufacture of semiconductor devices. However, because these solvents have adverse affects on the environment they are sometimes avoided, and in their place a safer solvent, water, such as water as pure water or ultrapure water is used. Pure water is water of a high purity of about 5 M$\Omega$cm to 18 M$\Omega$cm in resistivity. Pure water has almost all impurities such as ions, small particles, microorganisms and organic substances removed from it. Ultrapure water is water of an extremely high purity, higher than that of pure water, from which suspended matter and dissolved substances have been removed by means of an ultrapure water production apparatus. Ultrapure water has a higher resistivity than pure water.

When pure water or ultrapure water is electrolyzed, the resulting product is electrolytic ionic water such as an anode ionic water, which is strongly oxidized (acidic water), and cathode ionic water, which is strong reduced (alkaline water).

Of interest in the manufacture of semiconductor devices and liquid crystal devices and the like is washing and polishing semiconductor substrate surfaces using electrolytic ionic water, such as acidic ionic water or alkaline ionic water produced from pure water or ultrapure water.

Conventionally, pure water and ultrapure water have been highly purified using an ion exchange resin technique. However, with this method, not all elements are completely removed. In particular, positive ions of sodium, potassium, calcium and zinc and the like are not easily removed even with an ion exchange resin technique. When ultrapure water is used for washing a semiconductor wafer, mobile ions such as these are adsorbed onto the wafer and cause capacitance variations and reduction in the reliability of insulating films on the wafer, hindering the manufacture of semiconductor devices.

SUMMARY OF THE INVENTION

An object of the present invention is a purifying method and apparatus for greatly reducing the concentration of metal ions in pure water or ultrapure water and thereby producing purified pure water or ultrapure water effective for washing wafers or as a starting material for making electrolytic ionic water or for diluting washing water.

In the invention, to solve the kinds of problems described above, at least one pair of carbon electrodes, from which there is little detaching of carbon fragments, is disposed in an ultrapure water storage tank containing pure water or ultrapure water or in a purifying tank. The purifying tank is disposed in a line or conduit led from an ultrapure water storage tank. A D.C. voltage is applied across the pair of carbon electrodes. Automation can be achieved with respect to the current that flows for example by time controls or by operational linkage with a water level sensor. The invention employs a carbon electrode material with a large specific surface area. The electrode structure is such that there is little detaching of carbon fragments. For example, an electrode structure wherein the surface of a crystalline carbon molding is covered with a layer of amorphous carbon displays little detaching of carbon fragments. Also, the carbon electrodes can be covered with filters. Alternatively, a filter can be disposed in a line through which the ultrapure water is delivered.

Carbon electrodes are preferable because their large surface area raises the metal ion deposition efficiency. An electrode of crystalline carbon, such as graphite formed by a firing process, has many pores and an irregular surface. Therefore, after an electrode is molded, an amorphous carbon layer, for example, is formed on its surface. The carbon layer penetrates into the pores in the molding surface and consequently strengthens the bonds between the carbon elements and prevents carbon fragments from detaching. Also, as a result of the carbon electrode surfaces being covered with filters, even if carbon fragments do detach, they are caught by the filters and mixing of particles into the ultrapure water is thereby prevented. A barrier membrane for isolating the electrodes is not necessary.

When a D.C. voltage of 5 V to 30 V is applied across the pair of carbon electrodes and a weak current is passed between them, positive metal ions in the water collect and deposit at the cathode. If these metal ions collected at the cathode are removed, it is possible to markedly reduce the metal ion concentration of the pure water or ultrapure water. Also, because the adsorbing power of carbon, as represented by activated carbon, is strong, a certain amount of removal of metal ions by adsorption is possible even when a voltage is not being applied or a current is not being passed.

DETAILED DESCRIPTION OF THE PREFERRED EMBODIMENTS

Figure 1:
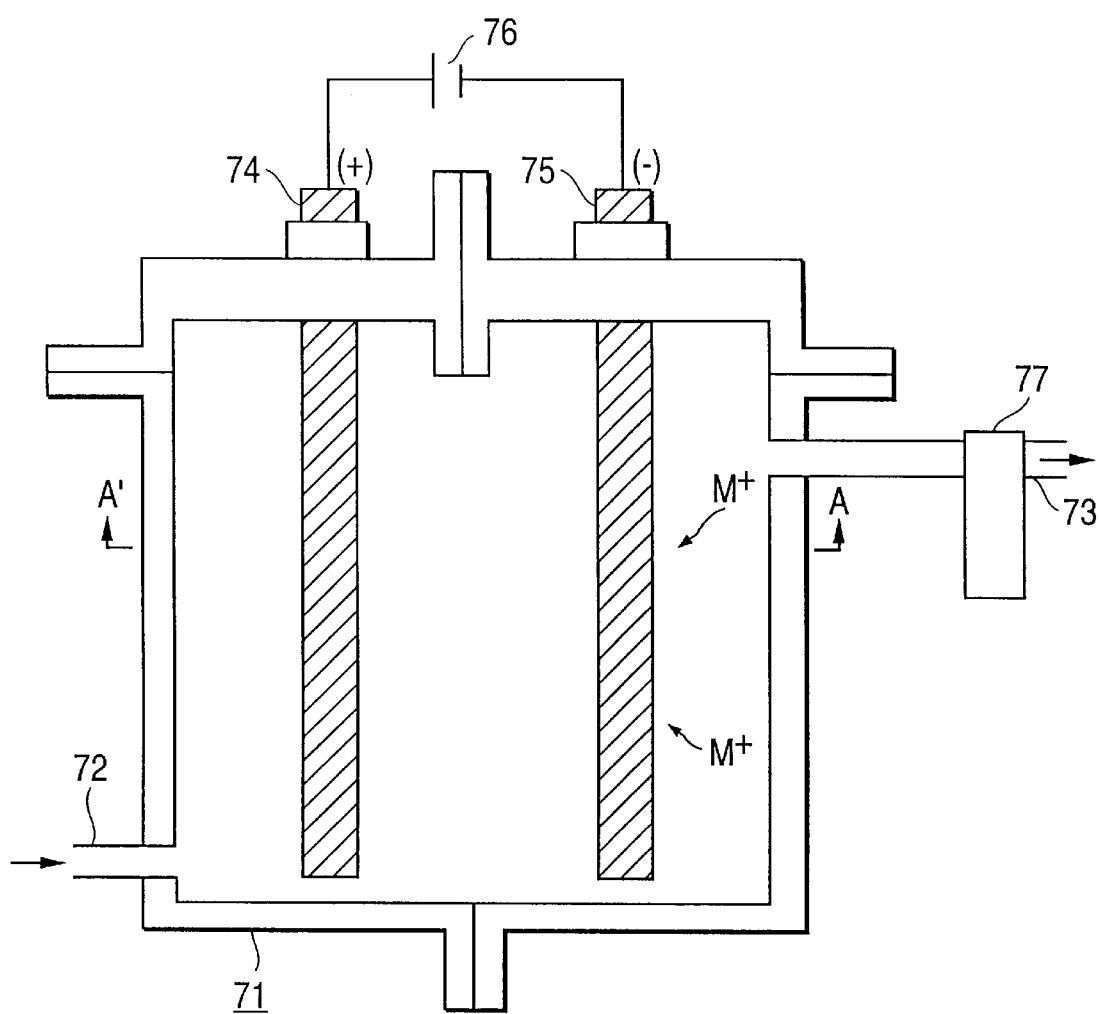
FIG. 1 is a schematic sectional view of an ultrapure water storage tank used in an ultrapure water purifying method according to the invention.

FIG. 1 is a schematic sectional view of an ultrapure water storage tank used in an ultrapure water purifying method according to the present invention. FIG. 1 shows a first preferred embodiment of an electrode structure for purifying ultrapure water or the like. Pure water or ultrapure water produced by an ultrapure water production apparatus (not shown) is supplied to an ultrapure water purifying tank 71 through a primary pure water supply line or conduit 72. The pure water or ultrapure water is stored in the ultrapure water purifying tank 71 and is supplied through a secondary ultrapure water supply line or conduit 73 to other equipment such as an electrolytic ionic water production apparatus (not shown) for producing electrolytic ionic water or a washing apparatus for semiconductor wafers or the like (not shown).

Pure water or ultrapure water is further purified in the ultrapure water purifying tank 71. At least one pair of electrodes (an anode 74 and a cathode 75) is disposed inside the ultrapure water purifying tank 71. The electrodes are connected to an external direct current (D.C.) power supply 76. The anode 74 is connected to the positive electrode of the D.C. power supply 76, and the cathode 75 is connected to the negative electrode. A voltage of about 5 V to about 30 V, for example 10 V, is impressed on the electrodes 74, 75. Metal ions contained in the pure water or ultrapure water adhere to the cathode 75 and the metal ion concentration of the pure water or ultrapure water markedly decreases. The purified pure water or purified ultrapure water is supplied from the ultrapure water purifying tank 71 to another system through the supply line 73. The capacity of the ultrapure water purifying tank 71 is, for example, 50 liters. The electrodes are, for example, plates that are 1 cm thick, 30 cm high, and 15 cm wide.

When carbon is used for the electrodes, carbon fragments often detach from the electrode moldings. These detached carbon fragments enter the pure water or ultrapure water and lower its quality. A filter may be used to remove such carbon fragments from the pure water or ultrapure water. A filter 77 is disposed in the secondary ultrapure water supply line 73, through which the pure water or ultrapure water purified in the ultrapure water purifying tank 71 is sent to another system.

Figure 2A:
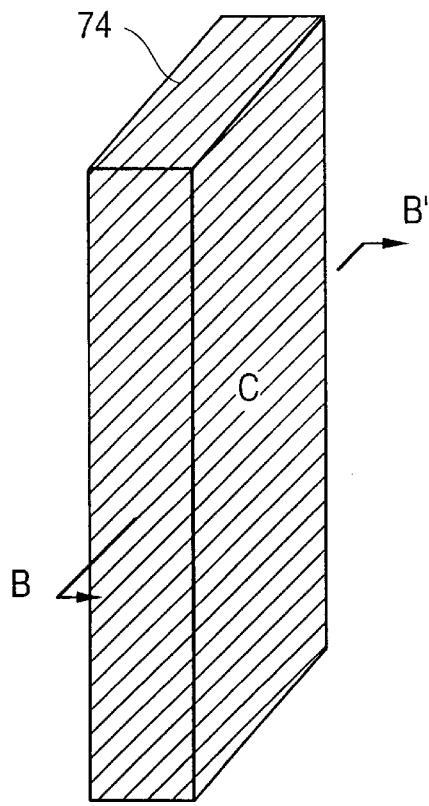
FIG. 2(a) is a perspective view.
Figure 2B:
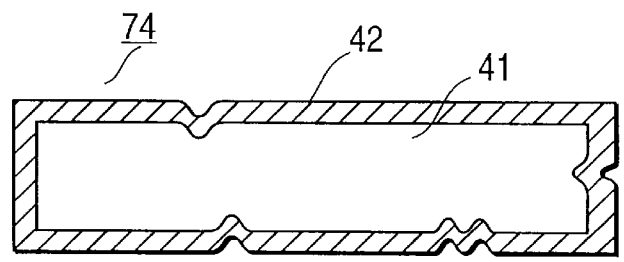
FIG. 2(b) a sectional view of an electrode along the line B–B' in FIG. 2(a).

FIG. 2(a) is a perspective view and FIG. 2(b) a sectional view of an electrode (an anode 74 or a cathode 75). The anode 74, as shown in FIG. 2(a), is plate-shaped. Various shapes can be used in the present invention. For example, bar-shaped or polygonal prismatic electrodes can be used. The anode 74 is obtained by molding crystalline carbon such as graphite and then firing it at a temperature of 1000° C. to 1200° C. for a time period of from several hours to several hundred hours. The fired block 41 is porous and has irregularities at its surface. The block 41 is dipped for a time period of from several hours to about three days in an amorphous carbon bath that is filled with carbon in an organic solvent under a reduced-pressure atmosphere. The dipping time depends on the size of the block 41. The carbon in the organic solvent penetrates into the center of the block 41. The block 41 is then baked at the temperature of about 2000° C.–about 3000° C. for about one day to three days. The resulting carbon coating layer 42 has a crystalline structure that is distinct from the crystalline structure of the carbon block. Because the carbon coating layer 42 is adhered along the irregularities of the block 41 surface, it strengthens the bonds between the carbon elements and prevents carbon fragments from detaching. Further, the carbon in the solvent fills in the pores in the block 41. Thus, the ratio of pores in the block 41 is improved to about 10% from about 14%, and the density changes to about 1.86 $g/cm^3$ from about 1.55 $g/cm^3$. The thickness of the carbon coating layer 42 is about 0.01 $\mu$m to several microns. Another method for forming the carbon coating layer 42 is a reduced-pressure CVD or vacuum vapor deposition or the like. The cathode 75 has the same constitution as the anode.

Figure 3:
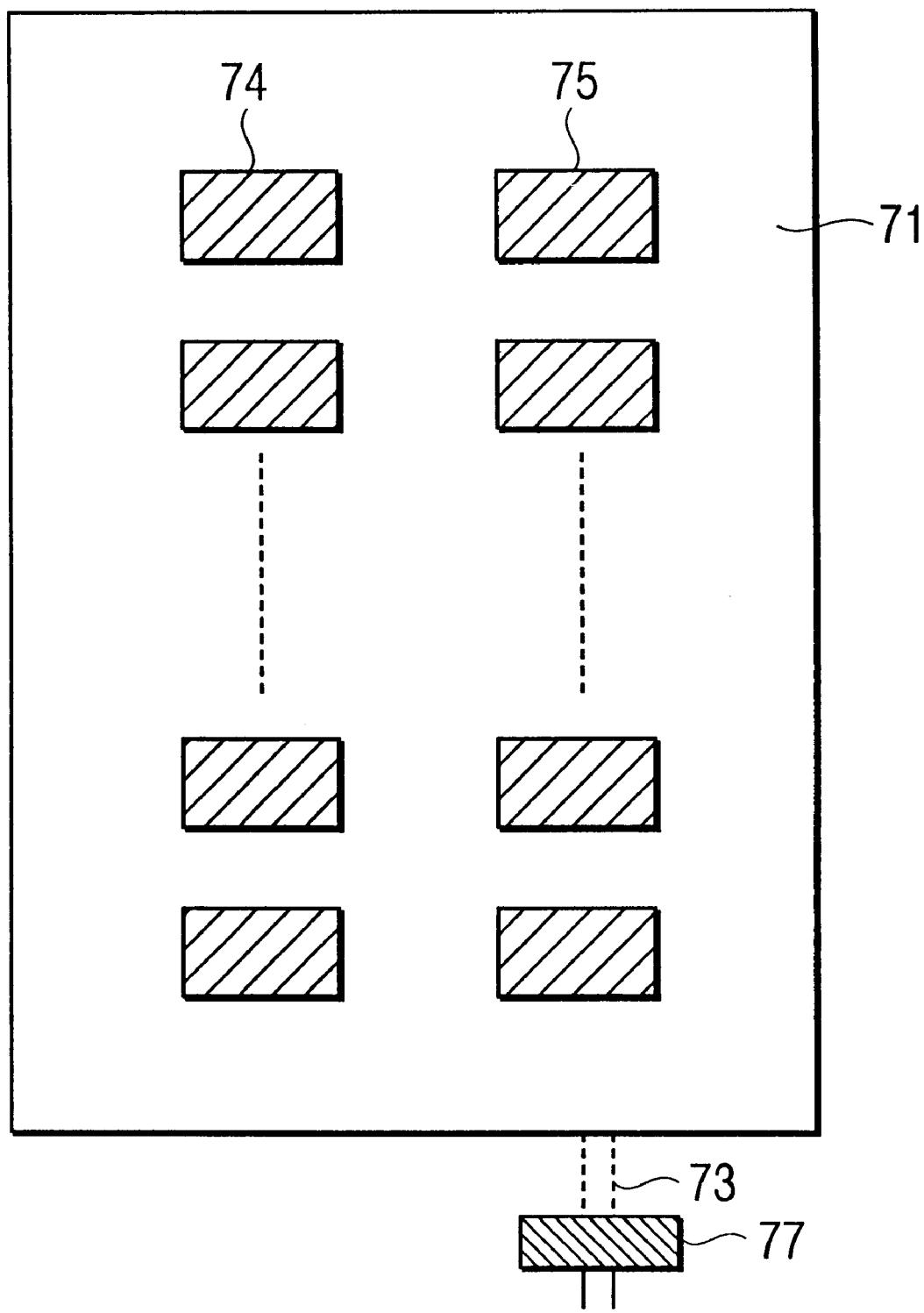
FIG. 3 is a sectional view along the line A–A' in FIG. 1.

FIG. 3 is a sectional view along the line A–A' in FIG. 1. Electrodes that are anodes 74 or cathodes 75 are made from a plurality of moldings as shown in FIG. 2. Although a partition such as an ion exchange membrane for isolating the anode 74 and the cathode 75 is not provided in this embodiment shown in FIG. 3, an ion exchange membrane or the like may be disposed between the anode 74 and the cathode 75.

Figure 4:
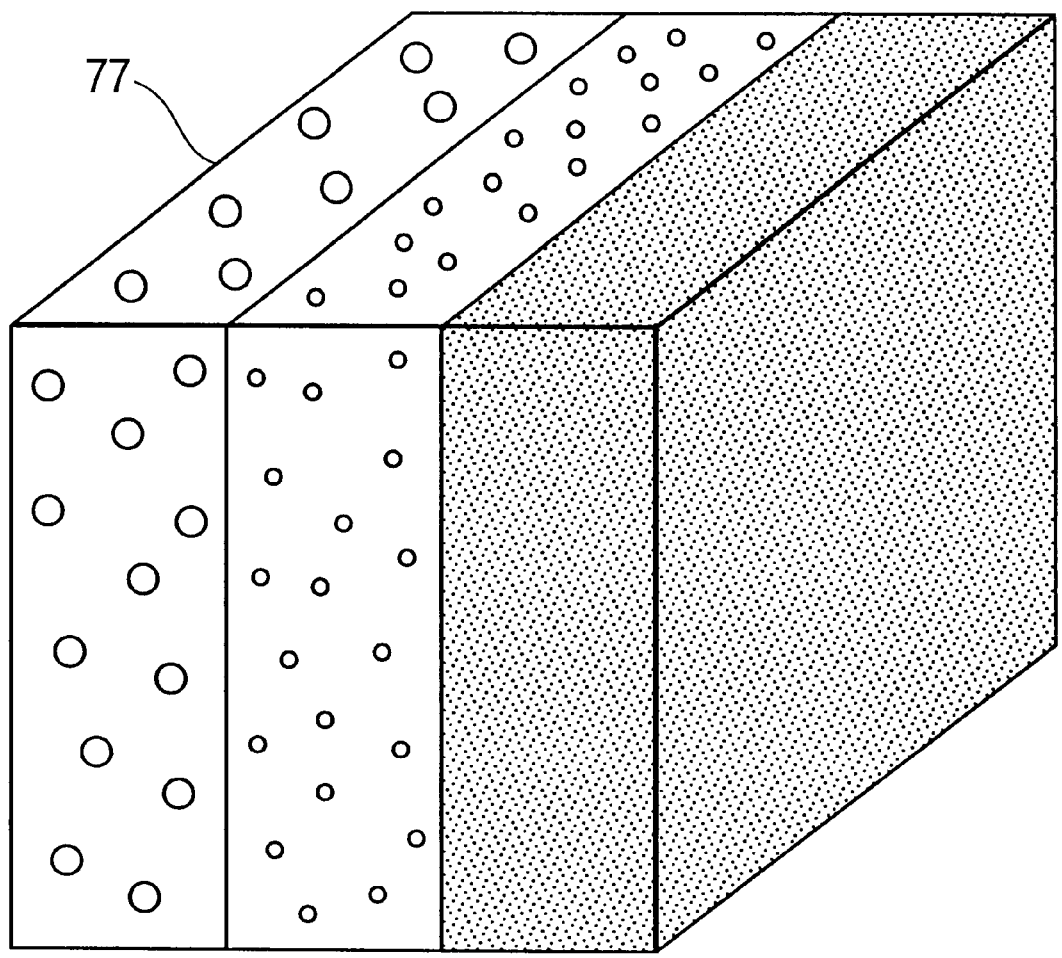
FIG. 4 is a perspective view of a high-purity filter used in the invention.

FIG. 4 is a perspective view of the filter 77. The filter 77 is disposed in the ultrapure water supply line 73. For example, a ceramic filter, which is a dry filter material made by firing quartz, is used for the filter 77. The ceramic filter 77 is made up of moldings of three layers having different particle diameters, and is effective at removing impurities.

Figure 5:
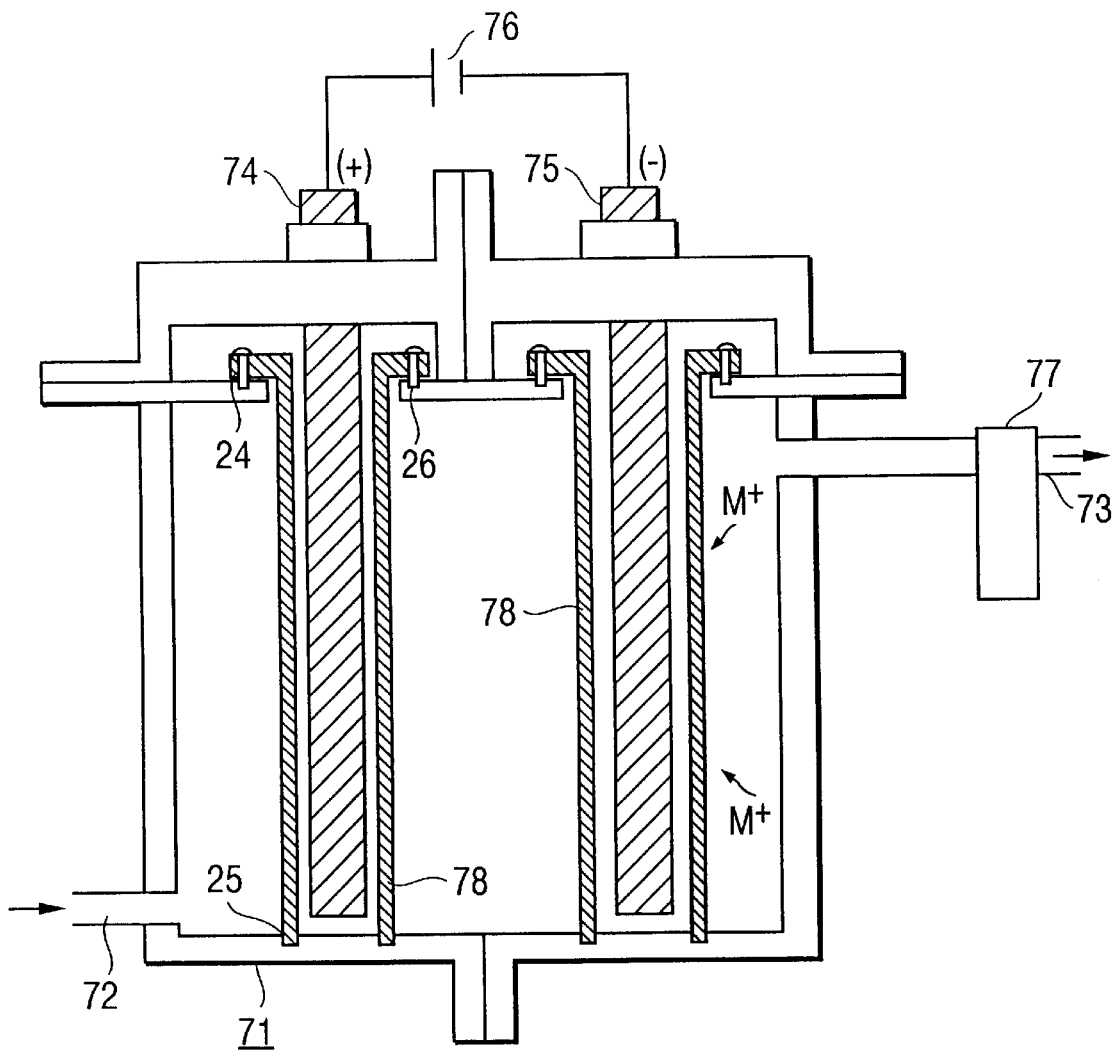
FIG. 5 is a schematic sectional view of an ultrapure water storage tank used in the invention.

FIG. 5 is a schematic sectional view of an ultrapure water purifying tank 71 and shows another embodiment of the invention. This electrode structure is different from that of the first embodiment in that the electrodes are surrounded by filters 78. The electrodes, which are an anode 74 and a cathode 75, are each covered, for example, by a highly clean filter made from silica, 78, such as is shown in FIG. 4. The electrodes may be either partly or entirely surrounded by the filter 78, and they are covered in parallel in FIG. 5. The distance between the electrodes 74, 75 and the filters 78 is about 3 mm to about 10 mm. The filters 78 and the ultrapure water purifying tank 71 body are joined for example with a screw 26 interposing packings or gaskets 24, 25.

Although detachment of carbon fragments from the anode 74 and the cathode 75 may be expected, the detached carbon fragments are caught by the filters 78 and are removed from the produced pure water or ultrapure water. Because in this embodiment the electrodes 74, 75 are provided with the filters 78, no additional filter may be needed in the ultrapure water supply line 73. Alternatively, the ceramic filter 77 in the ultrapure water supply line 73 may be provided in addition to covering the electrodes 74, 75 with the filters 78. This configuration improves the efficiency of removing carbon particles.

Figure 6:
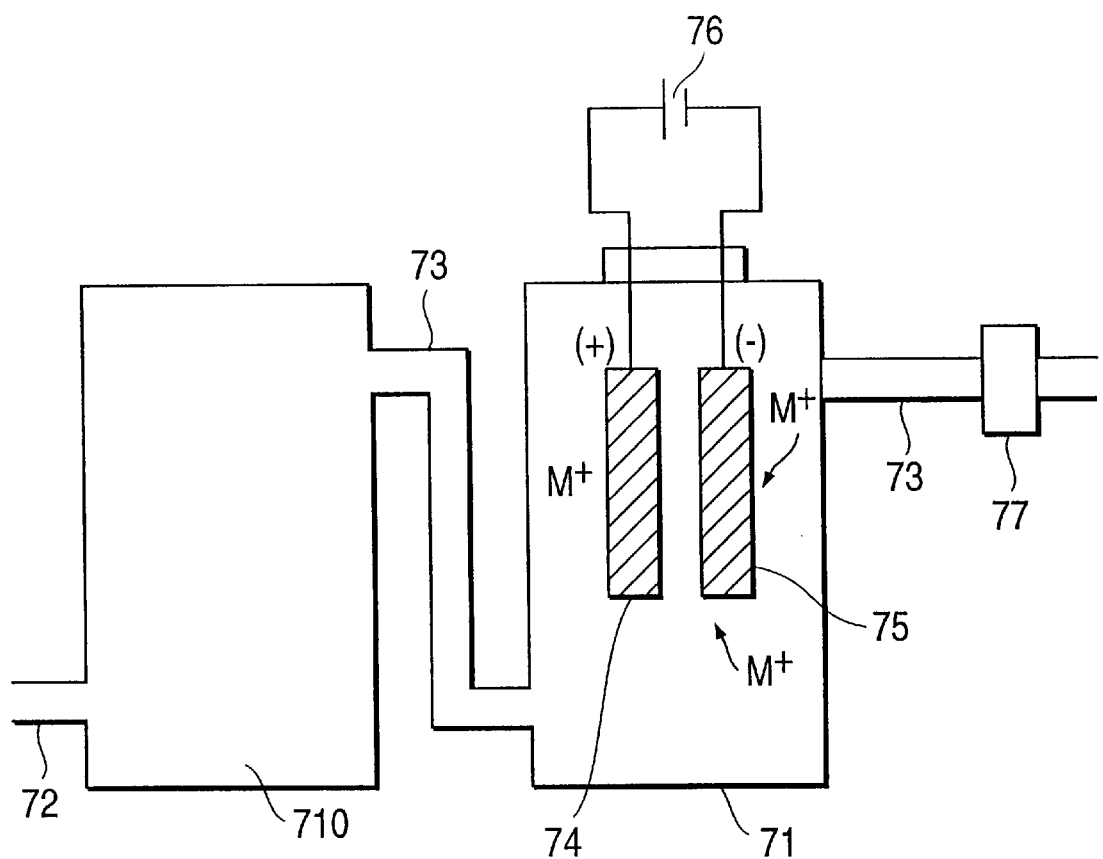
FIG. 6 is a schematic sectional view of an ultrapure water supply line having a purifying tank used in the invention.

FIG. 6 is a schematic sectional view of an ultrapure water supply line comprising an ultrapure water storage tank 710 and a purifying tank 71. Pure water or ultrapure water produced by an ultrapure water production apparatus is supplied to an ultrapure water storage tank 710 through an ultrapure water supply line 72. This ultrapure water storage tank 710 stores pure water or ultrapure water, and has no purifying apparatus. The stored pure water or ultrapure water is supplied to the purifying tank 71 through the ultrapure water supply line 73.

A purifying tank 71 is disposed in the ultrapure water supply line 73. At least one pair of electrodes (an anode 74 and a cathode 75) is provided inside the purifying tank 71. The electrodes 74, 75 are connected to an external D.C. power supply 76. The anode 74 is connected to the positive electrode of the D.C. power supply 76, and the cathode 75 is connected to the negative electrode.

A voltage of about 5 V to about 30 V, for example 10 V, is impressed on these electrodes 74, 75. Metal ions contained in the pure water or ultrapure water adhere to the cathode 75, and the metal ion concentration in the pure water or ultrapure water markedly decreases. This process produces purified pure water or purified ultrapure water of superior quality and high industrial value.

The purified pure water or purified ultrapure water can be used as washing water for semiconductor devices or liquid crystal device or the like. It can also be used as a base material of electrolytic ionic water for cleaning or etching in a semiconductor device or liquid crystal device manufacturing process. It can also be used to dilute electrolytic ionic water.

In accordance with the present invention, the concentration of metal ions in the pure water or ultrapure water can be greatly reduced because metal ions are collected at the cathode due to a weak current.

Figure 10:
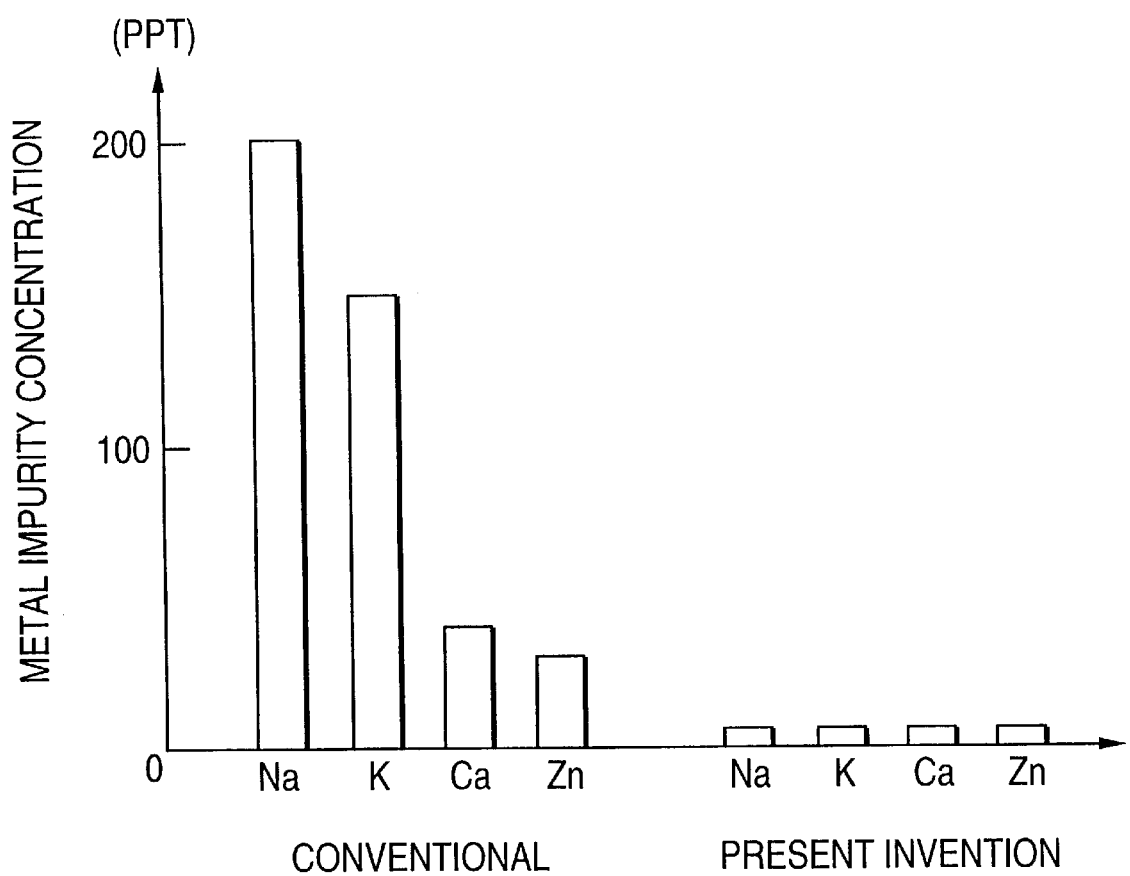
FIG. 10 is a chart showing characteristics of the invention and of the prior art. The vertical axis shows the concentration of metal impurities in the pure water or ultrapure water and the horizontal axis shows the types of the metal impurities.

FIG. 10 is a chart illustrating the purification effect achieved when the purification method of the present invention is applied. The vertical axis shows the concentration of metal impurities in the pure water or ultrapure water and the horizontal axis shows the types of the metal impurities. As shown in FIG. 10, compared to conventional pure water or ultrapure water that have not included the described electrolytic treatment, employing the electrolytic treatment of the invention reduces the concentrations of impurities such as sodium, potassium, calcium and zinc.

Figure 7:
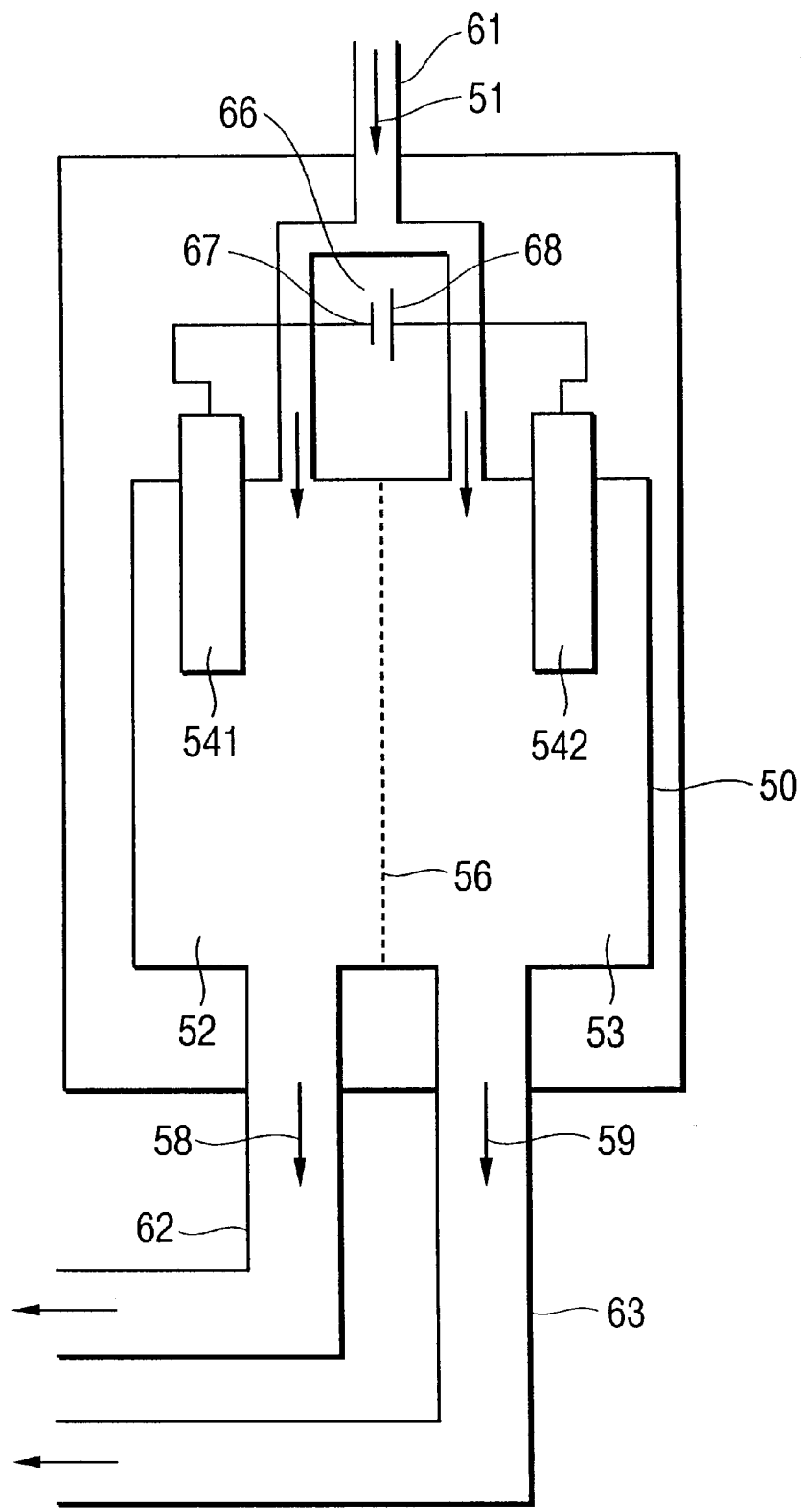
FIG. 7 is a schematic sectional view of an electrolytic ionic water production apparatus having metal electrodes.

FIG. 7 is a schematic sectional view of an electrolytic ionic water production apparatus having metal electrodes. An electrolytic cell 50 includes a cathode chamber 52 and an anode chamber 53. A cathode 541 is disposed in the cathode chamber 52 and an anode 542 is disposed in the anode chamber 53. The cathode 541 and the anode 542, both electrodes, are both made of platinum or titanium or the like.

To efficiently separate ionic water 58 produced in the cathode chamber 52 and alkaline ionic water 59 produced in the anode chamber 53, the cathode chamber 52 and the anode chamber 53 are partitioned by a porous ceramic or polymer barrier membrane 56. The cathode 541 in the electrolytic cell 50 is connected to the negative electrode 67 and the anode 542 to the positive electrode 68 of a D.C. power supply 66.

A dilute electrolytic solution as shown at arrow 51, which is made by adding a supporting electrolyte such as a small amount of ammonium chloride to pure water supplied from an ultrapure water supply line 61, is electrolyzed in the electrolytic cell 50 by impressing a voltage from the D.C. power supply 66. Electrolyzed alkaline ionic water or alkaline water is produced on the cathode 541 side. Acidic ionic water is produced on the anode 542 side.

The alkaline ionic water as shown at arrow 58 produced in the cathode chamber 52 is output through an alkaline ionic water supply line 62, and the acidic ionic water as shown at arrow 59 produced in the anode chamber 53 is output through an acidic ionic water supply line 63.

If a polishing apparatus for manufacturing semiconductor devices uses alkaline water, it is supplied to the polishing machine through the alkaline ionic water supply line 62. In such a case, the acidic ionic water or acid water 59, produced in the anode chamber 53 may be discarded. Accordingly, the acidic ionic supply line 63 is connected to an ionic water discharge line.

On the other hand, if a polishing apparatus for manufacturing semiconductor devices uses acid water, the acidic ionic water or acid water 59 is supplied to the polishing apparatus through the supply line 63. In this case, the alkaline ionic water or alkaline water 58 produced in the cathode chamber 52 is discarded. Accordingly, the alkaline ionic water supply line 62 is connected to an ionic water discharge line for discharging ionic water.

As described above, because the electrolytic cell 50 is divided by the barrier membrane 56 into two tanks 52, 53 and the electrodes 541, 542 are disposed in respective separated tanks, alkaline water 58 or acid water 59 can be drawn from the respective tank as needed.

The electrolytic alkaline ionic water or alkaline water, however, may include impurities because metal ions in the electrolytic solution and dissolved from the electrodes are pulled to the cathode chamber (the alkali chamber) by the electric field formed by the electrodes. Metal electrodes are normally manufactured in an ordinary room and various metal elements are contained in the electrodes. Even when electrodes are coated with a noble metal such as platinum or the like whose resistance to oxidation is high, small quantities of numerous metal elements, including platinum, elute in the anode chamber 53. This phenomenon occurs when electrodes are made from metal oxide. It is essential that there be no particles or metal contamination or the like when using electrolytic ionic water for washing a semiconductor substrate.

When carbon electrodes are used in an electrolytic cell 50, carbon on the anode side reacts with oxygen produced by the electrolysis of water as shown in the equation (1):

$$C+O_2 \rightarrow CO_2 \uparrow \tag{1}$$

Thus, the carbon electrodes break down. As a result the electrode surface is invaded and carbon fragments break from the electrode. These carbon fragments constitute an origin of undesirable particles.

The carbon fragments are suppressed by adding hydrochloric acid, which is a supporting electrolyte, at a high concentration. The concentration of the hydrochloric acid is in the range about 1,000 ppm (parts per million) to about 100,000 ppm.

Oxygen from the water and chlorine from the hydrochloric acid is produced as shown in equations (2) and (3):

$$2H_2O \rightarrow 4H^+ + O_2 \uparrow + 2e^- \tag{2}$$

$$2Cl \rightarrow Cl_2 \uparrow + 2e^- \tag{3}$$

Thus, with an electrolytic solution containing a concentration of hydrochloric acid over 1000 ppm, the main reaction around the electrodes produces chlorine, as shown in equation (3), and the production of oxygen is suppressed.

Because the reaction of equation (1) decreases remarkably, the carbon detachment from the carbon electrodes is suppressed. As a result, it is possible to produce a highly pure electrolytic ionic water containing no particles detached from the electrodes.

Figure 8:
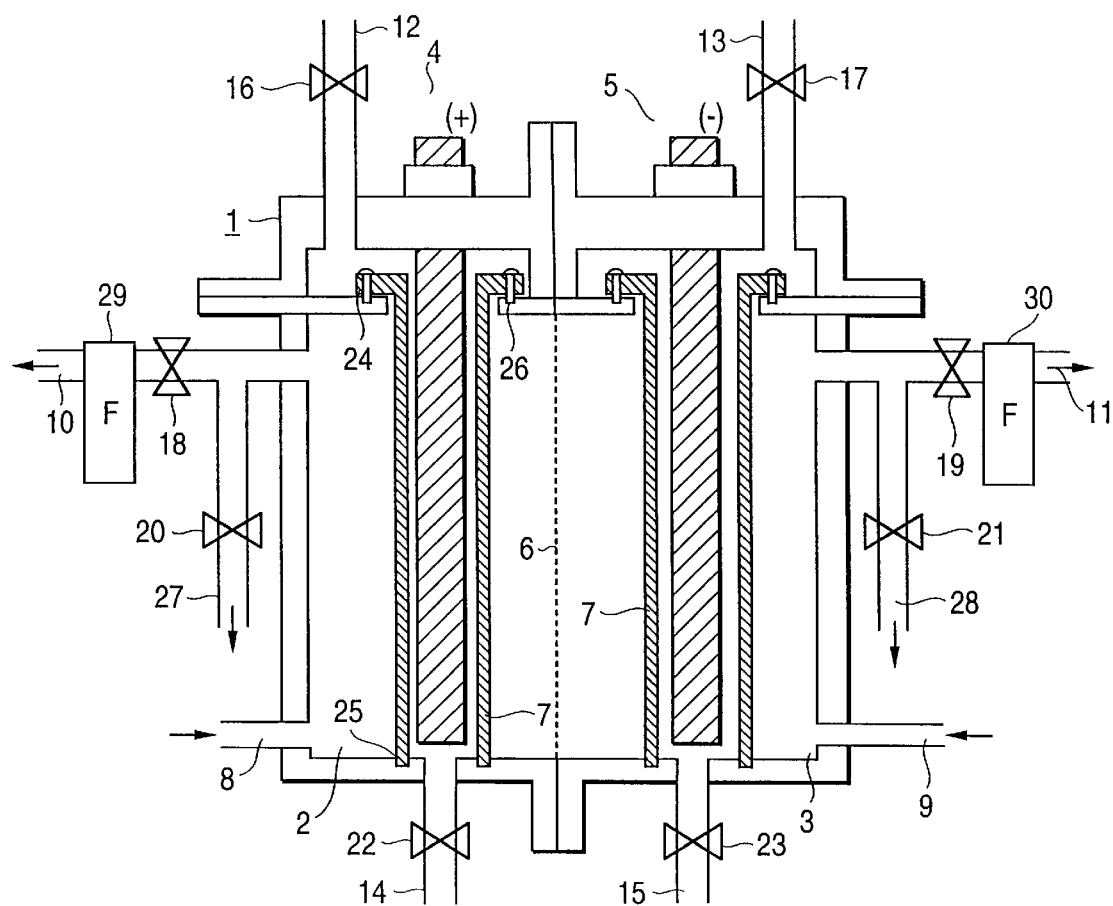
FIG. 8 is a schematic sectional view of an electrolytic ionic water production apparatus in which carbon electrodes are used.

FIG. 8 is a schematic sectional view of an electrolytic ionic water production apparatus using the carbon electrodes. An electrolytic cell 1 is divided into an anode chamber 2 and a cathode chamber 3, and the two chambers 2,3 are separated by an ion exchange membrane 6. A carbon anode 4 is disposed in the anode chamber 2 and a cathode 5 is disposed in the cathode chamber 3. The anode 4 and the cathode 5 each have one end fixed to an upper lid of the electrolytic cell 1. Although not shown in the figure, the anode 4 is connected to the positive electrode of a power supply and the cathode 5 is connected to the negative electrode of the power supply.

Ultrapure water or pure water with a supporting electrolyte is supplied into the bottom of the electrolytic cell 1 through first and second electrolyte-added ultrapure water supply lines 8 and 9. The first electrolyte-added ultrapure water supply line 8 is connected to the anode chamber 2 and the second electrolyte-added ultrapure water supply line 9 is connected to the cathode chamber 3. Electrolytic ionic water is produced by passing a current between the electrodes 4 and 5, thus electrolyzing ultrapure water with a supporting electrolyte, i.e. electrolytic solution. Acid water is produced in the anode chamber 2 containing the anode 4, and alkaline water is produced in the cathode chamber 3 containing the cathode 5. An acid water discharge line 10 is connected to the anode chamber 2 and an alkaline water discharge line 11 is connected to the cathode chamber 3 respectively.

Suitable electrolyte concentrations of the electrolytic solutions are about 1000 ppm to about 100,000 ppm (about 0.1 wt % to about 10 wt %) of hydrochloric acid for the electrolytic solution of the anode chamber 2, and about 10 to about 500 ppm of ammonia for the electrolytic solution of the cathode chamber 3. To raise conductivity, about 10 ppm to about 500 ppm of hydrochloric acid may be further added to the electrolytic solution supplied to the cathode chamber 3 corresponding to the amount of ammonia added to the anode chamber 3. The pH of the electrolytic solutions is about 8 to about 9.

The electrolytic ionic water discharge lines 10, 11 are also electrolytic ionic water supply lines for another apparatus such as a wafer washing apparatus. While electrolysis is carried out, shut-off valves 18, 19 of the electrolytic ionic water discharge lines 10, 11 are opened and shut-off valves 20, 21 of an acid water branch line 27 and an alkaline water branch line 28 are closed.

The electrodes (the anode 4 and the cathode 5) in the electrolytic cell 1 are covered with, for example, highly clean filters made from silica 7. The electrodes may be either partly or entirely surrounded by the filters 7. There is a gap of about 3 to about 10 mm between the electrodes and the filters. The filters 7 and the electrolytic cell 1 body are joined, for example, with a screw 26 interposing packings or gaskets 24, 25. Thus, if carbon fragments from the anode 4 and the cathode 5 become detached during the electrolysis process, the filters 7 catch the detached carbon fragments, and the fragments are not included in the produced electrolytic ionic water. Supplementary particle filters 29, 30 may be disposed in the electrolytic ionic water discharge lines 10, 11 as back-up filters.

The improvement of the electrode structure decreases the detachment of carbon fragments or dust from the carbon electrodes, but some carbon fragments remain inside the filters 7 after a long period of electrolysis. To remove these fragments, supply lines 12, 13 and discharge lines 14, 15 for ultrapure cleaning water are attached to the electrolytic cell 1. A first supply line for ultrapure cleaning water 12 is connected to the top of the anode chamber 2, and a first discharge line for ultrapure cleaning water 14 is connected to the bottom of the anode chamber 2. A second supply line for ultrapure cleaning water 13 is connected to the top of the cathode chamber 3 and a second discharge line for ultrapure cleaning water 15 is connected to the bottom of the cathode chamber 3.

When the insides of the filters are cleaned, the electrolysis process is stopped and the shut-off valves 18, 19 of the electrolytic ionic water discharge lines 10, 11 are closed. Shut-off valves 16, 17 in the supply lines for ultrapure cleaning water 12, 13 are then opened and the shut-off valves 20, 21 in the acid water branch line 27 and the alkaline water branch line 28 and shut-off valves 22, 23 in the supply lines for ultrapure cleaning water 14, 15 are opened. After carbon fragments inside the filters have been rinsed away, the shut-off valves 16, 17 and 20 to 23 are closed and the shut-off valves 18, 19 in the electrolytic ionic water discharge lines 10, 11 are opened and electrolysis is resumed.

Figure 9:
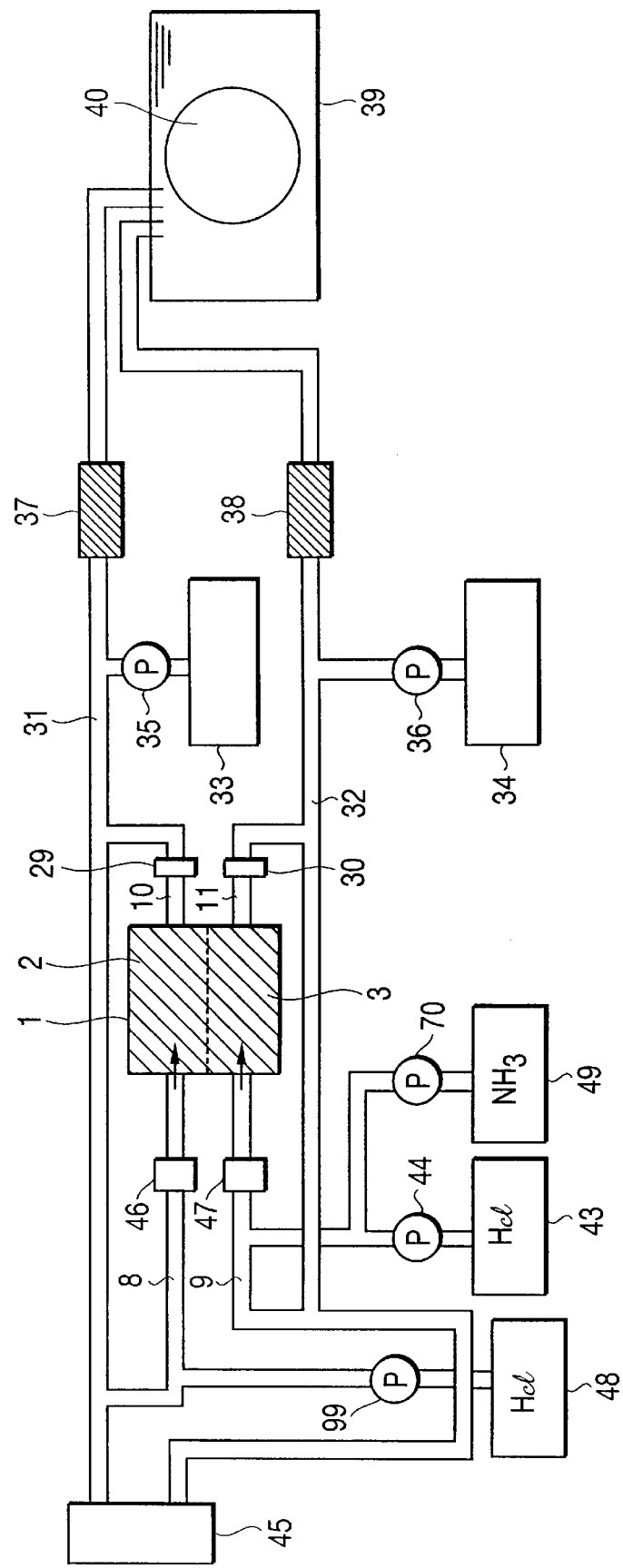
FIG. 9 is a system diagram of a semiconductor manufacturing apparatus with a system for supplying pure water or ultrapure water having an ultrapure water storage tank provided with the purifying apparatus according to the invention.

FIG. 9 illustrates a semiconductor wafer cleaning system for manufacturing semiconductor devices using pure water or ultrapure water. The system uses the electrolytic ionic water produced by the apparatus shown in FIG. 8. This system is basically made up of an ultrapure water storage tank 45 containing ultrapure water or pure water, an electrolytic ionic water production apparatus including an electrolytic cell 1, and a semiconductor wafer washing tank 39.

Although the supply lines and discharge lines for ultrapure cleaning water shown in FIG. 8 are provided, they are omitted in FIG. 9 since they do not directly relate to semiconductor wafer washing. A first ultrapure water line 31 and a second ultrapure water line 32 are connected to the ultrapure water storage tank 45. The first ultrapure water line 31 has a branch to an electrolyte-added ultrapure water supply line (electrolytic solution supply line) 8 and a confluence with an acid water discharge line 10 from the electrolytic cell 1, and is connected to the semiconductor wafer washing tank 39. The second ultrapure water line 32 has a branch to an electrolyte-added ultrapure water supply line (electrolytic solution supply line) 9 and a confluence with an alkaline water discharge line 11 from the electrolytic cell 1 and is also connected to the semiconductor wafer washing tank 39.

The electrolytic solution supply line 8 supplies to the electrolytic cell 1 an electrolytic solution made by ultrapure water added to hydrochloric acid (HCl) supplied from an electrolyte tank 48 by a pump 99 and a mixer 46. The electrolytic solution supply line 9 supplies to the electrolytic cell 1 an electrolytic solution made by ultrapure water added to hydrochloric acid (HCl) supplied from an electrolyte tank 43 by a pump 44 and a mixer 47 and ammonia supplied from an electrolyte tank 49 by a pump 70 and the mixer 47.

Acid water produced in the anode chamber is diluted with the ultrapure water from the ultrapure water line 31 so that the dissolved chlorine concentration after dilution becomes about 2 ppm to about 20 ppm. The ultrapure water mixed by a mixer 37 is used to clean a semiconductor wafer 40. The acid water may be used in combination with other chemicals, such as hydrofluoric acid, nitric acid and hydrochloric acid, to improve a removal effect for the particle and metal contamination of the semiconductor wafers. A concentration of the chemicals of about 0.1% to about 5% is suitable. These are introduced from a chemical tank 33 by a pump 35. The process conditions such as the particular chemicals and the concentration are chosen depending on the semiconductor wafers condition.

Alkaline water produced in the cathode chamber is diluted with the ultrapure water from the ultrapure water line 32 and mixed by a mixer 38. The rate of this dilution is about 10 to about 100 times. The alkaline water also is used in combination with a chemical such as a surfactant. A concentration of other chemicals of about 0.1% to about 5% is suitable. The chemical is introduced from a chemical tank 34 by a pump 36. The conditions such as mixed chemicals and the concentration are chosen depending on the semiconductor wafer process.

Electrolytic ionic water mixed by the mixers 37, 38 is supplied to the washing tank 39 and washes the semiconductor substrate 40. If metal electrodes are used for producing the electrolytic ionic water, metal elutes from the anode as ions. If carbon electrodes are used, oxidation of the anode ($CO_2$ production) causes carbon fragments to be detached and large quantities of particles are produced.

According to the present invention, the carbon fragments are suppressed because the ultrapure water with chlorine ions is electrolyzed. This electrolytic ionic water can be practically used for wafer washing and so on. The electrolytic ionic water, after dilution, has the same characteristics as electrolytic ionic water produced by being electrolyzed at a dilute concentration.

While there has been shown and described various embodiments of the present invention it will be evident to those of skill in the art that various modifications may be made thereto without departing from the scope of the invention which is set forth in the appended claims.

What is claimed is:

1. A method for purifying pure water in a purifying system including a purifying tank, a first conduit to introduce pure water, a pair of electrodes in said purifying tank, a power supply source connected to said electrodes, and a second conduit, said method comprising the steps of:

supplying pure water having a resistivity higher than 5 MΩcm to said purifying tank from said first conduit;

adhering ions in the pure water to one of the pair of electrodes by impressing a voltage between said electrodes; and removing purified pure water from said purifying tank through said second conduit.

2. A method for purifying pure water according to claim 1, wherein said pure water has a resistivity of about 5 MΩcm to 18 MΩcm.

3. A method for purifying pure water according to claim 1, wherein said pure water has a resistivity higher than about 18 MΩcm.

4. A method for purifying pure water according to claim 1, further comprising the step of:

filtering said purified pure water by a filter disposed in said second conduit.

5. A method for purifying pure water according to claim 1, further comprising the step of:

filtering the pure water in said purifying tank by at least one filter disposed around at least one of the electrodes.

6. A method for purifying pure water according to claim 1, wherein the steps of supplying, impressing and removing are carried out simultaneously.

7. A method for purifying pure water in a system including a purifying tank, a first conduit to introduce pure water, a pair of electrodes in said purifying tank, a power supply source connected to said electrodes, and a second conduit, said method comprising the steps of:

supplying pure water having a resistivity higher than 5 MΩcm to said purifying tank from said first conduit;

impressing a voltage between said electrodes; and removing purified pure water from said purifying tank through said second conduit, wherein said electrodes are covered by a carbon coating layer.

8. A method for purifying pure water according to claim 7, wherein said electrodes have a carbon molding and said carbon coating layer has a density higher than a density of said carbon molding.

9. A method for purifying pure water according to claim 8, wherein said carbon coating layer has a first crystalline structure and said carbon molding has a second distinct crystalline structure.

10. A method for purifying pure water in a purifying system including a purifying tank, a first conduit to introduce pure water, a pair of electrodes in said purifying tank, a power supply source connected to said electrodes, and a second conduit, said method comprising the steps of:

supplying pure water having a resistivity higher than 5 MΩcm to said purifying tank from said first conduit;

adsorbing metal ions in said pure water by impressing a voltage between said electrodes; and discharging purified pure water from said purifying tank through said second conduit.

11. An apparatus for purifying pure water according to claim 10, wherein one of said electrodes, responsive to the direct current, has the metal ions in the pure water in adhering contact.

12. An apparatus for purifying pure water comprising:

a purifying tank;

a first conduit for introducing pure water having a resistivity higher than 5 MΩcm into said purifying tank;

a second conduit for removing purified pure water from said purifying tank;

a plurality of electrodes in said purifying tank for adsorbing metal ions in the pure water; and a power supply source connected to said electrodes for supplying direct current to said electrodes.

13. An apparatus for purifying pure water according to claim 12, wherein one of said electrodes, responsive to the direct current, has metal ions in the pure water in adhering contact.

14. An apparatus for purifying pure water according to claim 12, wherein said electrodes comprise:

a carbon molding; and a carbon coating layer on the surface of said carbon molding, said carbon coating layer having a density higher than a density of said carbon molding.

15. An apparatus for purifying pure water according to claim 14, wherein said carbon coating layer is formed by dipping said electrodes in an amorphous carbon bath.

16. An apparatus for purifying pure water according to claim 14, wherein said carbon coating layer has a crystalline structure distinct from said carbon molding.

17. An apparatus for purifying pure water according to claim 14, further comprising a filter for filtering carbon particles.

18. An apparatus for purifying pure water according to claim 17, wherein said filter is disposed in said second conduit.

19. An apparatus for purifying pure water according to claim 17, wherein said filter is disposed around at least one of said electrodes.

20. An apparatus for purifying water according to claim 14, wherein said plurality of electrodes consists of a pair of electrodes.

21. An apparatus for purifying water according to claim 14, further comprising a storage tank for storing the pure water and supplying the pure water to said purifying tank through said first conduit.

* * * * *